United States Patent [19]

Pelters et al.

[11] Patent Number: 5,435,172

[45] Date of Patent: Jul. 25, 1995

[54] PROCESS FOR TESTING THE OPERATING EFFICIENCY OF EXHAUST GAS CATALYSTS

[75] Inventors: Stephan Pelters, Tiefenbronn; Dietmar Schwarzenthal, Bergisch Gladbach, both of Germany

[73] Assignee: Dr. Ing. h.c.F. Porsche AG, Weissach, Germany

[21] Appl. No.: 190,370

[22] Filed: Feb. 2, 1994

[30] Foreign Application Priority Data

Feb. 2, 1993 [DE] Germany .................. 43 02 779.2

[51] Int. Cl.[6] ............................................. G01M 15/00
[52] U.S. Cl. ................................... 73/118.1; 60/277
[58] Field of Search .................. 73/118.1; 374/144; 60/277; 340/438

[56] References Cited

U.S. PATENT DOCUMENTS

| | | |
|---|---|---|
| 5,060,473 | 11/1991 | Nakagawa . |
| 5,133,184 | 7/1992 | Geiger . |
| 5,191,762 | 3/1993 | Kuroda et al. ............ 60/277 |
| 5,265,416 | 11/1993 | Hamberg et al. .......... 60/277 |

FOREIGN PATENT DOCUMENTS

| | | |
|---|---|---|
| 0442648 | 8/1991 | European Pat. Off. . |
| 2758411 | 7/1978 | Germany . |
| 3516981 | 11/1986 | Germany ............ 60/277 |
| 3736259 | 7/1988 | Germany . |
| 3811732 | 10/1989 | Germany . |
| 3935381 | 5/1990 | Germany . |
| 4100397 | 8/1991 | Germany . |
| 4027207 | 3/1992 | Germany . |

*Primary Examiner*—Robert Raevis
*Attorney, Agent, or Firm*—Evenson, McKeown, Edwards & Lenahan

[57] ABSTRACT

For testing the conversion rate of exhaust gas catalysts inserted in an exhaust gas train of an internal-combustion engine, a process is provided which first requires a first operating condition during a time period while specified marginal requirements are met. If these requirements are met, an exhaust gas pulse is generated during a second time period, for example, during a coasting operation, which exhaust gas pulse does not correspond to this condition. The reaction of a temperature sensor which is arranged downstream of the catalyst is then analyzed. If the change of the exhaust gas temperature because of the exhaust gas pulse is not within specified limits, a signal is triggered which indicates an unacceptably low conversion rate.

14 Claims, 2 Drawing Sheets

PROCESS FOR TESTING THE OPERATING EFFICIENCY OF EXHAUST GAS CATALYSTS

BACKGROUND AND SUMMARY OF THE INVENTION

This invention relates to a process for testing the operating efficiency of exhaust gas catalysts inserted in the exhaust gas train of an internal-combustion engine.

A monitoring process is known from German Patent document DE-40 27 207 A. This monitoring process has several temperature sensors assigned to a catalyst. An average temperature value is formed from a long-term observation of measurable temperature variables and is compared with given limit values.

There is therefore needed a process for the testing of the operating efficiency of exhaust gas catalysts. The testing process must rapidly and reliably permit conclusions regarding the aging condition, that is, the conversion rate of the catalysts to be determined.

The present invention meets these needs by providing a process for testing the operating efficiency of exhaust gas catalysts inserted in the exhaust gas train of an internal-combustion engine. The internal-combustion engine is operated during a first time period. A first operating condition of the internal-combustion engine is determined by means of one or several parameters of the internal-combustion engine and/or the exhaust gas train which are sensed in an up-to-date manner and which are processed by a control unit and which, during this time period, must meet specified marginal conditions for the determination of this operating condition. The internal-combustion engine is operated during a second time period in the first operating condition if at least one of the sensed parameters corresponds to a specified desired value. Alternatively, a second operating condition of the internal-combustion engine is adjusted by changing the value of at least one of the sensed parameters of the internal-combustion engine. This second condition is recognized by the comparison of the up-to-date parameter value or values with specified desired values. The exhaust gas catalyst is acted upon by means of an exhaust gas pulse which does not correspond to the operating condition existing during the second time period. Values of at least one first parameter of the exhaust gas train which changes as a result of the exhaust gas pulse are sensed. At least one first parameter difference is formed from a parameter value sensed before or while the exhaust gas catalyst is acted upon by means of the exhaust gas pulse and its value after the exhaust gas catalyst is acted upon by means of the exhaust gas pulse. This first parameter difference is compared with a specified first desired difference range. The process is continued if this first parameter difference is within this desired difference range. The change of the first parameter is analyzed and a signal indicating the operational inefficiency of the exhaust gas catalyst is triggered if this change deviates from a desired change after one implementation or repeated implementations of the steps of this process. The operational inefficiency is stored in a fault memory of the control unit.

If the above process is used in the case of an internal-combustion engine, up-to-date information concerning the catalytic conversion rate of the exhaust gas catalyst may be obtained within a few seconds. The process can be carried out in different operating conditions of the internal-combustion engine or of a motor vehicle which is equipped with an internal-combustion engine; for example, in the idling operation, in the coasting operation, or in any partial-load operating point.

First, the internal-combustion engine is operated during a first time period, and a first operating condition is determined by an electronic control unit by means of parameters detected on an up-to-date basis. For this purpose, these parameters must meet certain marginal requirements during a specified lead time.

In this first operating condition, conditioned requirements of the internal-combustion engine and of the exhaust gas train exist so that there is sufficient reproduceability in the real driving operation. The parameters sensed in this case may, for example, be the engine load or rotational speed of the engine which, during the lead time, must comply with specific collective load and/or rotational-speed systems or with ranges or limit values.

After this first operating condition is determined, the internal-combustion engine continues to be operated in this first operating condition during a second time period if at least one of the sensed parameters corresponds to a specified desired value or, by means of the change of at least one value of a sensed parameter of the internal-combustion engine, a second operating condition is set, for example, by a change of the throttle valve angle to a coasting operation by the person operating the motor vehicle.

Furthermore, an idling operation, for example, may be set. This condition will subsequently be recognized by the comparison of the parameter value with the specified desired value. The second operating condition may also be any partial-load operating point in which the parameter corresponds to the desired value.

As a further step, in the second time period during the first operating condition, or after the recognition of the second operating condition, the exhaust gas catalyst is acted upon by an exhaust gas pulse of the internal-combustion engine which does not correspond to this condition. For example, in the idling operation, this pulse is generated by the fact that the injected fuel quantity of at least one cylinder of the internal-combustion engine does not correspond to the idling operation and a controlled under-stoichiometric or over-stoichiometric engine operation will therefore occur.

During coasting operation, in which the fuel supply is normally interrupted, the exhaust gas pulse can be generated, for example, by the injection of fuel into at least one cylinder, the ignition of which may be switched off for this purpose.

In an arbitrary partial-load point, the exhaust gas pulse may also be generated by one of the above-mentioned possibilities by means of the fuel quantity or the ignition.

The next step consists of the sensing of at least one first parameter in the exhaust gas train of the internal-combustion engine. This first parameter changes because of the exhaust gas pulse. This parameter may, for example, be at least one temperature sensed by a temperature sensor in front of, in, or behind the exhaust gas catalyst or catalysts. This temperature rises, for example, because of a short-term fuel rich driving operation. As an alternative in this respect, the concentration of a gas may be measured which is sensed by a gas probe, for example, the oxygen concentration by means of a lambda probe.

Before an analysis of the change of this first parameter value takes place, an abort criterion is checked as the next step. This avoids having an analysis takes place although, during the implementation of the process, certain parameters have changed on the basis of unpredicted events in such a manner that a reliable statement concerning the conversion rate would no longer be possible.

From at least one parameter value detected before, or while the exhaust gas catalyst is acted upon by the exhaust gas pulse, and from its value after the exhaust gas catalyst was acted upon, a first parameter difference is formed. This difference is compared with a specified first desired difference range. When, for example, during the coasting operation, the rotational speed changes in an unacceptable manner during this time period as a result of an abrupt braking, the process is terminated. If this parameter difference is within the desired difference range, an analysis of the first parameter will finally take place by means of the comparison of its change with a specified desired change.

After the above-mentioned process steps were again carried out or were carried out repeatedly, when there is an unacceptable deviation from the desired change, a signal is triggered which indicates the operating inefficiency of the exhaust gas catalyst. This signal is stored in the control unit and is displayed, for example, as a fault message in the dashboard of the motor vehicle.

The operating inefficiency is therefore not defined by the total failure of the conversion but by specific limit values.

In a particularly simple and space-saving manner, the analysis may take place by the comparison of the value of the first parameter sensed after the exhaust gas catalyst was acted upon with a specified stored desired value in that the change determined by means of this comparison is compared with a desired change range.

As a modification of the above, the analysis may take place by the direct measuring of the change of the value of the first parameter in that its value is, in addition, sensed during the second time period. A second parameter difference is formed from the two values and is compared with a specified stored second desired difference range.

The exhaust gas catalysts inserted in the exhaust gas train may be used as relatively large-volume main catalysts as well as comparatively small-volume starting catalysts.

The process according to the present invention requires only a few seconds to be implemented, so that disadvantageous effects of the exhaust gas pulse entered for a short time are not noticeable in the driving operation.

If the exhaust gas pulse is generated by an additional injection of fuel, the amount of fuel required for this purpose and the therefore emitted amount of exhaust gas are negligibly small.

By means of the adjustment of the marginal conditions, or of the desired changes in the control unit, an individual adaptation is possible to different internal-combustion engines, to different catalysts with their specific aging characteristics, as well as to tighter legal requirements or standards.

Other objects, advantages and novel features of the present invention will become apparent from the following detailed description of the invention when considered in conjunction with the accompanying drawings.

DETAILED DESCRIPTION OF THE DRAWINGS

Figure 1:
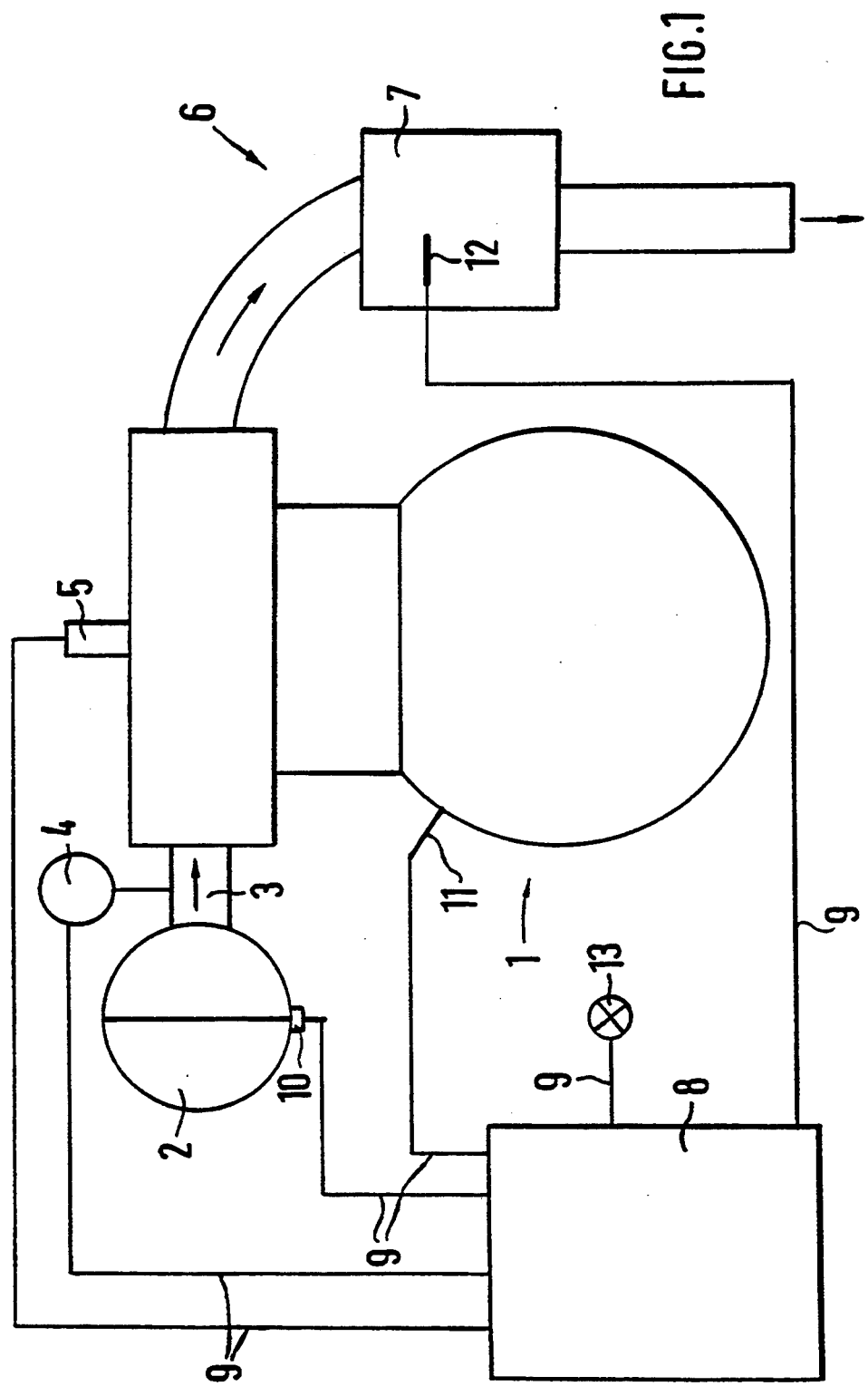
FIG. 1 is a schematic block diagram of an internal-combustion engine with an exhaust gas train.

An internal-combustion engine 1, which is installed in a motor vehicle (not shown), comprises an intake system 2 and a fuel injection system 4. The fuel injection system 4 acts upon intake pipes 3. Spark plugs 5 are used for the ignition of the supplied air/fuel mixture, and the corresponding exhaust gas is removed by way of an exhaust gas train 6 which comprises an exhaust gas catalyst 7.

By way of signal-carrying lines 9, the electronic control unit 8 is connected with an angle sensor 10 for sensing the throttle valve angle DW as a load signal L. The control unit 8 is further connected with a rotational speed sensor 11 for sensing the rotational speed N of the internal-combustion engine, and with the fuel injection system 4, spark plugs 5 and a temperature sensor 12 for sensing the exhaust gas temperature T.

During the operation of the internal-combustion engine 1, the control unit 8 continuously records values of the throttle valve angle DW and rotational speed N parameters that are sensed by the sensors 10 and 11. If these sensor values meet collective load, rotational speed and temperature values determined during a first time period t12 of, for example, 60 seconds, and stored in the control unit 8, this control unit 8 determines at the end of time period t12 a first operating condition B1 at a point in time t2. The internal-combustion engine 1 and the exhaust gas train 6 are now conditioned for the continuation of the process.

In the further course of the operation, in which the time window defined by the time period t12 is renewed continuously, the operating condition of the internal-combustion engine changes in response to a driver's actions as a result of the reduction of the throttle valve angle DW to a value which corresponds to the coasting operation. For this value, a desired value is stored in the control unit 8.

By means of the continuous comparison of the throttle valve angle DW, sensed in an up-to-date manner, with this desired value, a coasting operation is determined when this desired value is reached, by the control unit 8 as a second operating condition B2, during which the fuel injection system 4 is switched off.

Subsequently, the ignition of a cylinder of the internal-combustion engine is switched off for two rotations of the crankshaft. In this case, during the second rotation, the injection valve of the fuel injection system 4 assigned to this cylinder is activated by the control unit 8. As a result, a brief exhaust gas pulse is generated which is not normal for a regular coasting operation. Together with the exhaust gas of the other cylinders which do not experience the exhaust gas pulse, the injected fuel quantity is fed to the exhaust gas catalyst 7 and causes an exothermal reaction on its catalytic surface. Then, the temperature sensor 12 will sense an increased value for the exhaust gas temperature T.

Figure 2:
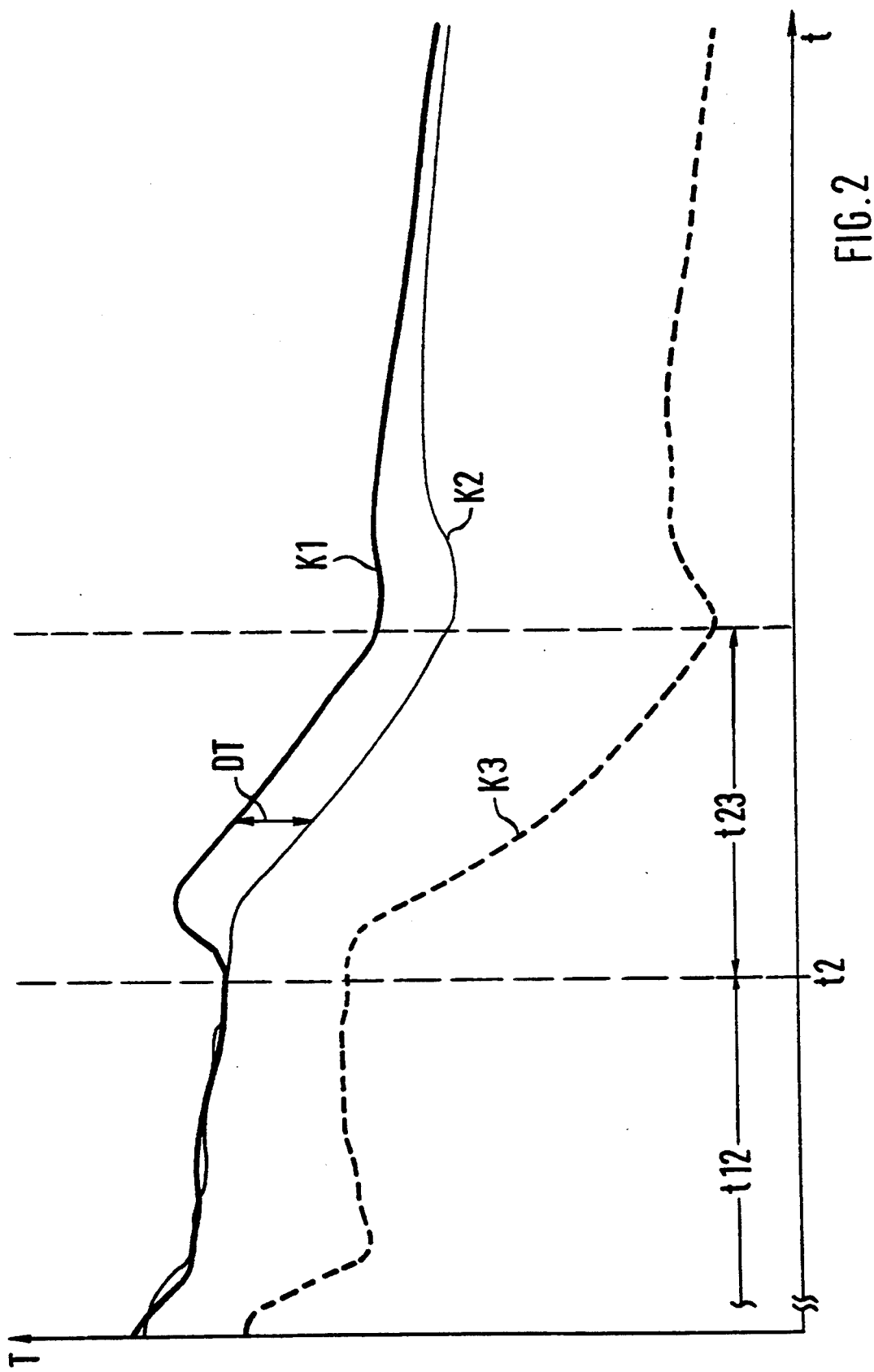
FIG. 2 is a graphical representation of the course of a parameter value over time.

The course of this temperature T over time is illustrated in FIG. 2 in the form of a graph, on whose abscissa the time t is entered and on whose ordinate the exhaust gas temperature T is entered. The temperature T is sensed by the sensor 12. A first curve K1 shows the course of the temperature downstream of an operationally efficient exhaust gas catalyst 7 with a brief additional injection of fuel, while a second curve K2 illustrates this course without any additional injection. The almost identical course during the first time period t12 until the determination of the first operating condition B1 is clearly visible.

This is followed by the second time period t23 with a temperature rise DT in the case of the additional injection in comparison to curve K2.

For comparison, a third curve K3 shows the temperature course of an exhaust gas catalyst with an additional injection wherein the conversion rate is already very impaired. Despite this additional injection, the course of the curve is similar to that of curve K2. However, because of the poor conversion rate, curve K3 is clearly shifted toward lower temperatures and is largely identical with a course without any additional injection. A usable signal difference cannot be obtained.

For taking into account unpredicted parameter changes while this process is carried out, in the next step, a first parameter difference DP1 is formed from the value of the rotational speed N of the internal-combustion engine while the exhaust gas catalyst 7 is acted upon by the exhaust gas pulse and from its value after it was acted upon.

By means of the comparison with a specified stored first desired difference range DPS1, the control unit 8 determines whether DP1 is within DPS1. If this is so, the process of testing the operating efficiency of exhaust gas catalysts is continued by means of an analysis; otherwise it is terminated.

For analysis, the change of the exhaust gas temperature T sensed as the first parameter is compared with a desired change stored in the control unit 8. If a repeated implementation of this process results in an unacceptable deviation from the desired change in each pass, this condition is stored in a fault memory of the control unit 8 and a signal lamp 13 is activated.

In this case, for achieving reliable results, during each implementation of the process, the number of crankshaft rotations is changed during which the ignition is blanked out or an additional injection takes place, whereby the injected amount is varied.

A rapid analysis is achieved by means of the comparison of the value of T after the exhaust gas pulse with a specified desired value, and the subsequent comparison of the thus determined change with a desired changed range.

As a modification of the above, the value of the exhaust gas temperature T may, in addition, be sensed and stored after the recognition of the second operating condition B2. From this value and the value which occurs as a result of the exhaust gas pulse, a second parameter difference DP2 is formed and is compared with a specified second desired difference range DPS2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for testing an operating efficiency of an exhaust gas catalyst inserted in an exhaust gas train of an internal-combustion engine, the process comprising the steps of:

a) operating the internal-combustion engine during a first time period and determining a first operating condition of the internal-combustion engine via one or more parameters of at least one of the internal-combustion engine and the exhaust gas train, which parameters are sensed in an up-to-date manner and which are processed by a control unit, said parameters, during the first time period, meeting specified marginal conditions for a determination of the first operating condition;

b) operating the internal-combustion engine during a second time period in the first operating condition if at least one of the sensed parameters corresponds to a specified desired value, or if said at least one of the sensed parameters does not correspond to the specified desired value, then adjusting the internal-combustion engine into a second operating condition by changing a value of at least one of the sensed parameters of the internal-combustion engine and, recognizing the second operating condition by comparing the up-to-date parameter values with specified desired values for the second operating condition;

c) acting upon the exhaust gas catalyst with an exhaust gas pulse which does not correspond to the second operating condition existing during the second time period and which produces one of an under or over-stoichiometric engine operation;

d) sensing values of at least one first parameter of the exhaust gas train which changes as a result of the exhaust gas pulse;

e) forming at least one first parameter difference between a parameter value sensed before or while the exhaust gas catalyst is acted upon by the exhaust gas pulse and its value after the exhaust gas catalyst is acted upon by the exhaust gas pulse, and comparing the first parameter difference with a specified first desired difference range, and continuing the process if the first parameter difference is within the first parameter desired difference range; and f) analyzing a change of the first parameter and triggering a signal indicating an operational inefficiency of the exhaust gas catalyst if the change deviates from a desired change after at least one implementation of the process steps and, storing the operational inefficiency in a fault memory of the control unit.

2. A process according to claim 1, wherein the analysis step takes place by a comparison of the value of the first parameter with a specified desired value and by a subsequent comparison of the thus determined change with a desired change range.

3. A process according to claim 1, wherein the value of the first parameter is additionally sensed before the exhaust gas pulse and, for the analysis step, a second parameter difference is formed from the value and the value of the parameter occurring as a result of the exhaust gas pulse, and the second parameter difference is compared with a specified second desired difference range.

4. A process according to claim 1, wherein the first parameter is at least one temperature measured in the exhaust gas train.

5. A process according to claim 1, wherein the first parameter is a concentration of a gas sensed in the exhaust gas train by at least one gas probe.

6. A process according to claim 5, wherein a lambda probe is used as the gas probe.

7. A process according to claim 1, wherein the second operating condition is a coasting operation of a motor vehicle equipped with the internal-combustion engine, the ignition of at least one cylinder being switched off temporarily.

8. A process according to claim 7, wherein the exhaust gas pulse is generated during the coasting operation by an injection of fuel.

9. A process according to claim 8, wherein when the process is carried out repeatedly, the injected amount of fuel is varied.

10. A process according to claim 1, wherein the second operating condition is an idling operation of the internal-combustion engine.

11. A process according to claim 10, wherein an injected fuel quantity of at least one cylinder of the internal-combustion engine produces said exhaust gas pulse which does not correspond to the second operating condition.

12. A process according to claim 11, wherein during the idling operation, the ignition of at least one cylinder of the internal-combustion engine is switched off.

13. A process according to claim 10 wherein during the idling operation, the ignition of at least one cylinder of the internal-combustion engine is switched off.

14. A process according to claim 1, wherein the first parameter difference is formed from values of one of a rotational speed of the internal-combustion engine and an engine load.

* * * * *